(12) United States Patent
Fujita et al.

(10) Patent No.: US 7,430,761 B2
(45) Date of Patent: *Sep. 30, 2008

(54) COMMAND PROCESSING SYSTEM BY A MANAGEMENT AGENT

(75) Inventors: Takahiro Fujita, Yokohama (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/497,912

(22) Filed: Aug. 1, 2006

(65) Prior Publication Data

US 2006/0272029 A1 Nov. 30, 2006

Related U.S. Application Data

(62) Division of application No. 10/637,994, filed on Aug. 8, 2003, now Pat. No. 7,257,843.

(30) Foreign Application Priority Data

Nov. 8, 2002 (JP) ............................. 2002-324685

(51) Int. Cl.
H04L 9/32 (2006.01)
H04L 9/14 (2006.01)
G06F 17/30 (2006.01)

(52) U.S. Cl. .................... 726/27; 726/2; 726/3; 707/9

(58) Field of Classification Search ............. 726/2–3, 726/27; 707/9
See application file for complete search history.

(56) References Cited

U.S. PATENT DOCUMENTS 5,218,701 A 6/1993 Miyazaki (Continued)

FOREIGN PATENT DOCUMENTS

EP 0898216 A2 2/1999

(Continued)

OTHER PUBLICATIONS

English Translation of JP-06-337844, Dec. 1994. The translation is provided by McElroy Translation Company for USPTO, dated Aug. 2007.*

(Continued)

*Primary Examiner*—Minh Dieu Nguyen
(74) *Attorney, Agent, or Firm*—Townsend and Townsend and Crew LLP

(57) ABSTRACT

In a system where a management application sends commands to a remotely-located agent over a network, the agent maintains a security specification table defining the security level for each combination of the cipher and authentication algorithms of the communication path to/from the management application and a required security level table defining the minimum security level required for the execution of each command. Upon receiving a command from the management application, the agent obtains, by referencing these tables, the operational security level of the communication path and the required security level for the command, and executes the command only if the former is greater than or equal to the latter. This mechanism ensures high security in system management by preventing a malicious intruder from executing potent commands that can cause a down of a computer system, without unreasonably limiting the use of the management application by the system administrator.

4 Claims, 5 Drawing Sheets

U.S. PATENT DOCUMENTS

| | | | |
|---|---|---|---|
| 5,345,506 | A | 9/1994 | Tsubakiyama et al. |
| 5,602,916 | A | 2/1997 | Grube et al. |
| 5,917,840 | A | 6/1999 | Cheney et al. |
| 6,128,735 | A | 10/2000 | Goldstein et al. |
| 6,226,749 | B1 | 5/2001 | Carloganu et al. |
| 6,363,150 | B1 | 3/2002 | Bhagavath et al. |
| 6,622,050 | B2 | 9/2003 | Thompson |
| 6,760,843 | B1 | 7/2004 | Carter |
| 6,990,591 | B1 | 1/2006 | Pearson |
| 6,993,654 | B2 | 1/2006 | Seki et al. |
| 7,068,680 | B1 | 6/2006 | Kaltenmark et al. |
| 2002/0016914 | A1* | 2/2002 | Seki et al. .................. 713/172 |
| 2002/0035685 | A1 | 3/2002 | Ono et al. |
| 2002/0095602 | A1 | 7/2002 | Pherson et al. |
| 2002/0169960 | A1 | 11/2002 | Iguchi et al. |
| 2003/0115447 | A1 | 6/2003 | Pham et al. |
| 2003/0120949 | A1 | 6/2003 | Redlich et al. |
| 2004/0017913 | A1 | 1/2004 | Hawkes et al. |
| 2005/0091522 | A1 | 4/2005 | Hearn et al. |
| 2006/0271707 | A1* | 11/2006 | Cheline et al. .............. 709/245 |

FOREIGN PATENT DOCUMENTS

| | | | |
|---|---|---|---|
| EP | 1255179 | A2 | 11/2002 |
| EP | 1255179 | A3 | 11/2002 |
| JP | 06-337844 | * | 12/1994 |
| JP | 08-263382 | A | 10/1996 |
| WO | WO 99/45454 | A1 | 9/1999 |

OTHER PUBLICATIONS

European Patent Office (EPO) search report for EPO patent application EP07016296 (Nov. 11, 2007).

* cited by examiner

FIG. 2

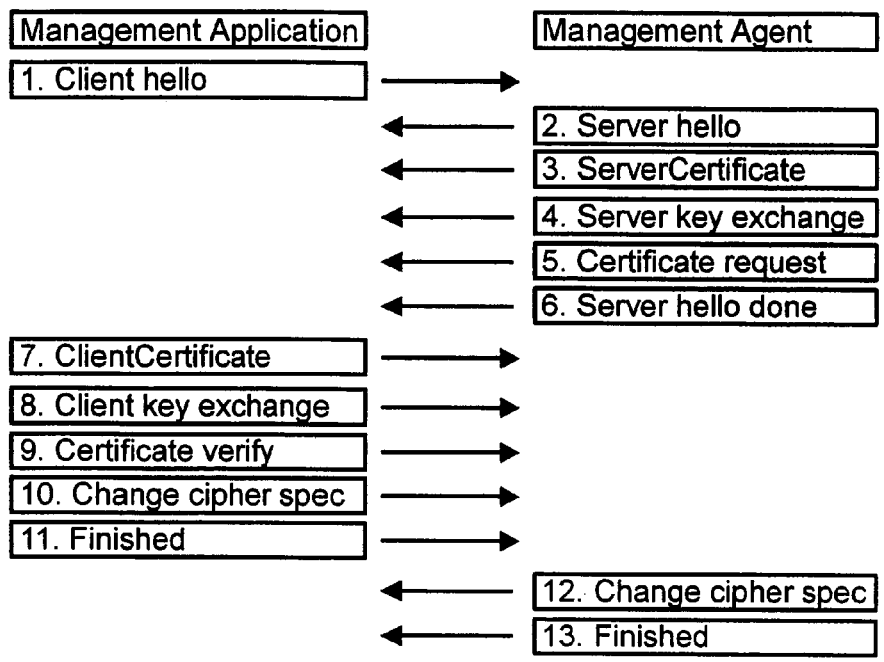

| Management Application | | Management Agent |
|---|---|---|
| 1. Client hello | → | |
| | ← | 2. Server hello |
| | ← | 3. ServerCertificate |
| | ← | 4. Server key exchange |
| | ← | 5. Certificate request |
| | ← | 6. Server hello done |
| 7. ClientCertificate | → | |
| 8. Client key exchange | → | |
| 9. Certificate verify | → | |
| 10. Change cipher spec | → | |
| 11. Finished | → | |
| | ← | 12. Change cipher spec |
| | ← | 13. Finished |

| Authentication Algorithm | Communication Path Cipher Algorithm | Security Level |
|---|---|---|
| Basic | HTTP | 1 |
| MD5 Digest | HTTP | 2 |
| Basic | HTTPS( SSL_RSA_EXPORT_WITH_RC2_CBC_40_MD5 ) | 3 |
| MD5 Digest | HTTPS( SSL_RSA_EXPORT_WITH_RC2_CBC_40_MD5 ) | 3 |
| SSL | HTTPS( SSL_RSA_EXPORT_WITH_RC2_CBC_40_MD5 ) | 3 |
| Basic | HTTPS( SSL_RSA_WITH_RC4_128_MD5 ) | 4 |
| MD5 Digest | HTTPS( SSL_RSA_WITH_RC4_128_MD5 ) | 4 |
| SSL | HTTPS( SSL_RSA_WITH_RC4_128_MD5 ) | 5 |

| Command | Required Security Level |
|---|---|
| GetVolumeInfo | 1 |
| AssignVolume | 3 |
| FormatVolume | 5 |

FIG.3(C)

| Client ID | Security Level of Established Communication Path | Security Level Required of Command Executed | Execution Permitted? |
|---|---|---|---|
| A | 1 | 2 | No |
| B | 4 | 1 | Yes |
| C | 4 | 1 | Yes |
| D | 4 | 5 | No |
| A | 1 | 3 | No |
| A | 5 | 4 | Yes |

| Client ID | Security Level Uplift |
|---|---|
| A | +2 |
| B | 0 |
| C | 0 |
| D | +1 |

| |
|---|
| SSL_NULL_WITH_NULL_NULL={ 0x00,0x00 } |
| SSL_RSA_WITH_NULL_MD5={ 0x00,0x01 } |
| SSL_RSA_WITH_NULL_SHA={ 0x00,0x02 } |
| SSL_RSA_EXPORT_WITH_RC4_40_MD5={ 0x00,0x03 } |
| SSL_RSA_WITH_RC4_128_MD5={ 0x00,0x04 } |
| SSL_RSA_WITH_RC4_128_SHA={ 0x00,0x05 } |
| SSL_RSA_EXPORT_WITH_RC2_CBC_40_MD5={ 0x00,0x06 } |
| SSL_RSA_WITH_IDEA_CBC_SHA={ 0x00,0x07 } |
| SSL_RSA_EXPORT_WITH_DES40_CBC_SHA={ 0x00,0x08 } |
| SSL_RSA_WITH_DES_CBC_SHA={ 0x00,0x09 } |
| SSL_RSA_WITH_3DES_EDE_CBC_SHA={ 0x00,0x0A } |
| SSL_DH_DSS_EXPORT_WITH_DES40_CBC_SHA={ 0x00,0x0B } |
| SSL_DH_DSS_WITH_DES_CBC_SHA={ 0x00,0x0C } |
| SSL_DH_DSS_WITH_3DES_EDE_CBC_SHA={ 0x00,0x0D } |
| SSL_DH_RSA_EXPORT_WITH_DES40_CBC_SHA={ 0x00,0x0E } |
| SSL_DH_RSA_WITH_DES_CBC_SHA={ 0x00,0x0F } |
| SSL_DH_RSA_WITH_3DES_EDE_CBC_SHA={ 0x00,0x10 } |
| SSL_DHE_DSS_EXPORT_WITH_DES40_CBC_SHA={ 0x00,0x11 } |
| SSL_DHE_DSS_WITH_DES_CBC_SHA={ 0x00,0x12 } |
| SSL_DHE_DSS_WITH_3DES_EDE_CBC_SHA={ 0x00,0x13 } |
| SSL_DHE_RSA_EXPORT_WITH_DES40__CBC_SHA={ 0x00,0x14 } |
| SSL_DHE_RSA_WITH_DES_CBC_SHA={ 0x00,0x15 } |
| SSL_DHE_RSA_WITH_3DES_EDE_CBC_SHA={ 0x00,0x16 } |
| SSL_DH_anon_EXPORT_WITH_RC4_40_MD5={ 0x00,0x17 } |
| SSL_DH_anon_WITH_RC4_128_MD5={ 0x00,0x18 } |
| SSL_DH_anon_EXPORT_WITH_DES40_CBC_SHA={ 0x00,0x19 } |
| SSL_DH_anon_WITH_DES_CBC_SHA={ 0x00,0x1A } |
| SSL_DH_anon_WITH_3DES_EDE_CBC_SHA={ 0x00,0x1B } |
| SSL_FORTEZZA_DMS_WITH_NULL_SHA={ 0x00,0x1C } |
| SSL_FORTEZZA_DMS_WITH_FORTEZZA_CBC_SHA={ 0x00,0x1D } |

COMMAND PROCESSING SYSTEM BY A MANAGEMENT AGENT

CROSS-REFERENCES TO RELATED APPLICATIONS

This application is a divisional of, and claims priority to, U.S. patent application Ser. No. 10/637,994, now issued U.S. Pat. No. 7,257,843, filed Aug. 8, 2003, which claims priority to Japanese Application No. 2002-324685, filed Nov. 8, 2002, and which is hereby incorporated herein by reference.

BACKGROUND OF THE INVENTION

The present invention relates to a method for managing a computer system in a storage area network environment by means of a management agent.

One of the most common schemes for managing a computer system is to have a management application and a management agent so arranged that the latter provides the former with a management interface for operating its constituent devices. Thanks to recent advances in the Web technology, use of XML messages is becoming increasingly popular as a means of communication between the management application and the management agent. This kind of arrangement allows the management application to utilize remotely located management agents via the Web (or an ordinary IP network), thereby facilitating centralized management.

In such an arrangement, the management agent employs user authentication to prevent the settings of the computer system or its constituent devices from being altered by users other than the system administrator. If no security measures such as authentication are employed, a malicious user (cracker) might be able to crack into the system by stealing the system administrator's identity and altering messages during transmission. This might cause the management agent to falsely modify the settings of a device, thereby resulting in a system down.

In typical conventional arrangements of this sort, the only mechanisms to prevent unauthorized execution of commands on the system's constituent devices have been cryptography, such as a cipher system applied to the communication path between the management application and the management agent, and user authentication. Since cryptography in itself does not control the executability of commands on the target device, if it is broken on the communication path the cracker who has also managed to disguise himself/herself as an authorized user would be able to have any commands executed on the target device.

If for tighter security the management agent were to always demand a sufficiently secure communication path and a sufficiently secure authentication method, then it would become necessary to provide them even for those management applications which do not require such a tight security level. This would limit the management applications that the system administrator can use.

SUMMARY OF THE INVENTION

It is an object of the present invention to provide a means for ensuring high security in the management of a computer system by preventing a malicious and unauthorized intruder from executing potent commands that can cause a significant disruption or down of a computer system, without unreasonably limiting the use of the management application by the system administrator.

In a preferred embodiment of the present invention, an ad hoc program is introduced which runs on a storage subsystem and which, upon receiving a management command from a system management computer, determines whether it should be executed or rejected, judging from the security level of the communication path from/to the system management computer and the security level required for the execution of the command.

BRIEF DESCRIPTION OF THE DRAWINGS

FIG. 2 shows an example of the procedures for establishing a ciphered communication path between the management application and the management agent.

FIG. 3 shows an example of the layout and contents of four tables (A through D): the security level specification table (A), the required security level table (B), the history table (C), and the security level uplift table (D).

FIG. 5 is a sample of the table listing SSL3 cipher algorithms.

DESCRIPTION OF THE PREFERRED EMBODIMENT

Figure 1:
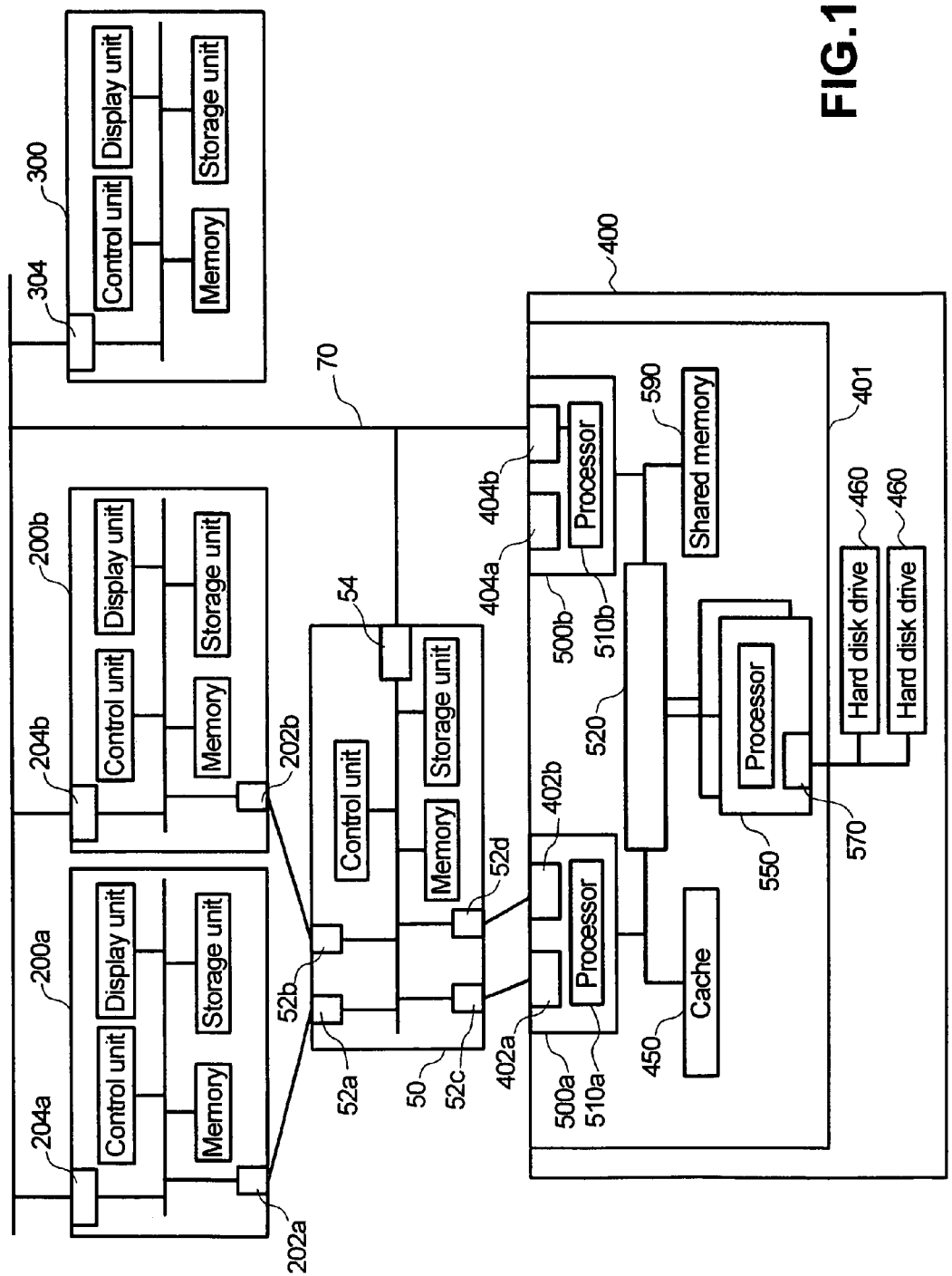
FIG. 1 illustrates the configuration of a computer system according to the preferred embodiment of the present invention.

FIG. 1 illustrates the configuration of a computer system according to the preferred embodiment of the present invention. A computer system 1 comprises a computer 200a, another computer 200b (these two may also be collectively called a computer 200), a management computer 300, a fiber channel switch 50, an Internet Protocol (hereinafter abbreviated to IP) network 70, and a storage subsystem 400.

The storage subsystem 400 is connected to the computers 200a and 200b through the fiber channel switch 50 and also to the management computer 300 through the IP network 70.

The SCSI Protocol over Fiber Channel (hereinafter abbreviated to FCP) is used for data transmission between the computer 200a or 200b and the storage subsystem 400.

The fiber channel switch 50 comprises a control unit, a memory, a storage unit, interface units 52a, 52b, 52c, and 52d for communication with the storage subsystem 400, and an interface unit 54 for communication with the IP network 70.

The storage subsystem 400 comprises a control unit 401 and one or more hard disk drives 460. The control unit 401 further comprises a channel adapter 500a and another channel adapter 500b (these two may also be collectively called a channel adapter 500), a cache memory 450, a shared memory 590, one or more disk adapters 550, and a crossbar switch 520. The crossbar switch 520 interconnects the channel adapter 500, the cache memory 450, the shared memory 590, and the disk adapters 550. As an alternative, a bus can be used instead of the crossbar switch 520.

A string of hard disk drives 460 are connected to each disk adapter 550 through a port 570.

The channel adapter 500a has a processor 510a and fiber channel ports 402a and 402b, through which it receives FCP-based I/O requests issued by computers 200a and 200b, respectively.

The channel adapter 500b has a processor 510b and IP network ports 404a and 404b. The channel adapter 500b communicates with the management computer 300 through the IP network port 404b.

The storage subsystem 400 contains one or more logical volumes, each having a logical storage area. Each logical volume corresponds to part or all of the physical storage area that is made up of a string of hard disk drives 460. A logical volume corresponds to a storage area accessible by the computer 200 and is given a unique identification within the computer system 1. The computer 200 issues I/O commands based on FCP against a logical volume.

The disk adapter 550 transfers data between the string of disk drives 460 connected to it, the cache memory 450, and the channel adapter 500. It also controls the cache memory 450 and the channel adapter 500. For example, it can control the string of disk drives 460 connected to it as a redundant array of inexpensive disks (RAID), thereby enhancing the reliability and performance of the storage subsystem 400.

To compensate for the low rate of data transfer between the hard disk drives 460 and the channel adapter 500, the storage subsystem 400 holds frequently accessed data in the cache memory 450.

The computer 200a comprises not only a control unit, a memory, a storage unit, and a display unit, just like any other computers, but also an interface unit 202a for connection with the fiber channel switch 50 and an interface unit 204a for connection with the network 70. The computer 200b has a similar configuration.

The management computer 300 comprises not only a control unit, a memory, a storage unit, and a display unit, just like any other computers, but also an interface unit 304 for connection with the network 70. By loading the management application stored in its storage unit into the memory and executing it, the management computer 300 controls the storage subsystem 400 through the network 70 to which the storage subsystem 400 is also connected. The management computer 300 also communicates with the computer 200 and the fiber channel switch 50 through the network 70.

Running on the processor 510b, which is part of the channel adapter 500b, is a special program (management agent) for communicating with the management computer 300. It receives setup and control commands from the management application running on the management computer 300, and by executing them, sets up and controls the storage subsystem 400.

The management agent runs not only on the storage subsystem 400 but also on the fiber channel switch 50 and the computer 200. Thus, the management application running on the management computer 300 can obtain the status of, and modify the settings of, the fiber channel 50 as well as the computer 200 through the management agent running on them.

The communication between the management application, which runs on the management computer 300, and the management agent, which runs on the channel adapter 500, is based on the Hyper Text Transfer Protocol (HTTP), by which messages written in extensible Markup Language (XML) are exchanged between the two.

For security reasons, i.e., to prevent eavesdropping, ID theft, and unauthorized modification of messages, the communication between the management application and the management agent employs cipher based on the secure sockets layer (SSL) protocol. The SSL protocol, which operates on the TCP/IP protocol, operates underneath higher level protocols such as HTTP (application layer) and enhances the security level of the communication path. SSL's handshaking protocol first determines the cipher algorithm and then establishes a secure communication path.

FIG. 2 describes the procedures for establishing a ciphered communication path using the SSL handshaking protocol between the management application and the management agent, taking SSL3 as an example.

First, the management application (SSL client) sends "Client Hello" to the management agent (SSL server) (step 1: Client Hello) together with a list of the cipher algorithms supported by the management application and, in the case of resumption of an existing session, the session ID. The list is prioritized according to the order desired by the management application. The management application then waits for "Server Hello."

FIG. 5 is an example of a list of cipher algorithms. For each cipher algorithm, a two-byte ID is assigned.

The management agent selects one from the list of cipher algorithms sent by the management application and generates a session ID, and then sends "Server Hello" to the management application together with the decision on the cipher algorithm and the session ID (step 2: Server Hello). The management application saves this session ID for later communications, so that by including it in "Client Hello" the management application can, without going through the handshaking protocol, establish a ciphered communication path.

The procedures for selecting one cipher algorithm are as follows: The management agent, which holds a list of cipher algorithms supported by it, goes through the list of cipher algorithms sent from the management application in descending order of priority and checks whether there is a match between the two lists. The first match will be selected.

Alternatively, the management agent may have its list of supported cipher algorithms sorted by their strength (robustness) and go through this list in descending order of strength to look for a match. This method will result in the strongest algorithm being selected. The strength of a cipher algorithm is basically determined by the length of the cipher key employed. For example, SSL_RSA_WITH_RC4_128_MD5, which uses a 128-bit key, is stronger (more robust) than SSL_RSA_EXPORT_WITH_RC4_40_MD5, which uses a 40-bit key. The preferred embodiment of the present invention uses, as examples of cipher algorithm, SSL_RSA_EXPORT_WITH_RC2_CBC_40_MD5 (which is weaker) and SSL_RSA_WITH_RC4_128_MD5 (which is stronger).

If there is no match between the management application's list and the management agent's list, or if the management application does not support SSL, then ciphering will not take place.

Upon receiving a session ID from the management application, the management agent checks the sessions currently in progress for a match in ID. If it finds a session having the same ID, it chooses the cipher algorithm of that session to establish a secure communication path with the management application.

After step 2, the management agent sends to the management application, as necessary, its own electronic certificate (step 3: Server Certificate), its own public key (step 4: Server Key Exchange), and a request for the management application's certificate (step 5: Certificate Request), notifies the management application of the completion of transmission (step 6: Server Hello Done), and waits for a response from the management application.

Upon receiving "Server Hello Done," the management application sends its own electronic certificate if it has also received "Certificate Request" (step 7: Client Certificate). Then it sends a session key ciphered according to the public key cipher algorithm specified by the cipher algorithm sent with "Server Hello" (step 8: Client Key Exchange). This session key will be used to generate the secret key to be used in the common key cipher in later communication. The management application then sends a message for verifying the management application's certificate (step 9: Certificate Verify) if necessary, notifies the management agent that it is now ready to start ciphered communication using the secret key (step 10: Change Cipher Spec), and finally notifies the management agent of the end of transmission (step 11: Finished).

Upon receiving "Finished," the management agent notifies the management application that it is now ready to start ciphered communication (step 12: Change Cipher Spec), followed by a notification of the end of transmission (step 13: Finished). The ciphered communication path is thus established.

Once an SSL-ciphered communication path has been established, the management application running on the management computer 300 sends to the storage subsystem 400 a processing request for the management agent as an XML message, using HTTP Post Request. This XML message contains a command for the storage subsystem 400, which is to be executed by the management agent running on the processor 510b, as will be explained later.

FIG. 3 shows an example of the layout and contents of four tables (A through D): the security level specification table 1000 (A), the required security level table 1100 (B), the history table 1200 (C), and the security level uplift table 1300 (D), which are held in the shared memory 590 and are used by the management agent.

The security level specification table 1000 assigns a security level to the combination of the cipher algorithm used between the management application and the management agent and the authentication algorithm used by the management agent, and is referenced to determine the operational security level between the management application and the management agent.

In the security level specification table 1000, the "communication path cipher algorithm" means the cipher algorithm for the communication between the management application and the management agent that is determined in step 2: Server Hello. "HTTP" means that SSL-based cipher is not employed.

In the security level specification table 1000, the "authentication algorithm" refers to the system by which the management agent authenticates the management application. If the client certificate has been received and verified in step 7: Client Certificate during handshaking, "SSL" is entered here. If the client certificate has not been received or verified, a standard HTTP authentication algorithm specified by the Authentication header of the HTTP request message is applicable, which is either Basic based on the user ID and password or MD5Digest. Of the two, Basic, in which the password is sent unmodified over the communication path, is less secure because it can be stolen through wire-tapping or eavesdropping. MD5Digest, in which a hash value calculated from the password is sent instead of the password itself, is more secure because the password itself cannot be stolen. Regardless of the authentication algorithm employed, however, a communication path can be given a high security level if it is based on HTTPS, is ciphered, and is difficult to eavesdrop. In the example of the preferred embodiment described here, for the HTTP that is not ciphered, security level 1 is given to Basic, and security level 2 is given to MD5Digest.

When HTTPS (SSL_RSA_EXPORT_WITH_RC2_CBC_40_MD5) is used as the communication path, the same security level (level 3) is assigned to both Basic and MD5Digest. Also when HTTPS (SSL_RSA_WITH_RC4_128_MD5) is used, the same security level (level 4 in this case) is assigned to both Basic and MD5Digest. If SSL authentication is employed, however, higher security levels can be assigned: level 5, for example, when HTTPS (SSL_RSA_WITH_RC4_128_MD5) is used. With HTTPS (SSL_RSA_EXPORT_WITH_RC2_CBC_40_MD5), which does not have strong (robust) enough cipher capability, however, security level 3 is assigned even if SSL authentication is employed.

The required security level table 1100 lists all the commands that the management application may issue to the management agent, together with the security levels that are required for their execution. This table is referenced to obtain the security level required for the execution of a command received from the management application. The higher the security level, the stronger the cipher algorithm, that is, the safer the communication.

The security level required of a command, i.e., the security level that is required for the execution of a command, is determined by the possible impact the execution of the command can have on the storage subsystem 400 and the computer system 1. For example, for GetVolumeInfo, a command for obtaining information on the capacity and status of a device (volume) in the storage subsystem 400, the required security level can be low, since its execution would not have any impact on the storage subsystem 400. In contrast, the required security level for AssignVolume, a command for changing the settings of the storage subsystem 400, should be high, since it would allow the storage subsystem 400 to be accessed by the computer 200. Furthermore, the required security level for FormatVolume, a command for formatting or initializing a volume in the storage subsystem 400, should be still higher, since its execution would erase the entire contents of the designated volume, which are being used by the computer 200, thereby rendering the computer 200 inoperable and causing a significant impact on the computer system 1.

Whereas in the foregoing example of the present invention the required security level is determined by the impact the execution of the command may have on the system, alternatively it may be determined also by the importance of the information to be accessed. For example, if the information on the storage subsystem 400 is considered sensitive, then by making the required security level for the GetVolumeInfo command higher, it is possible to prevent unauthorized access to it.

The history table 1200 records the history of commands issued from the management application to the management agent and has basically four entries per line: the client ID, which is used for authentication by the management application issuing the command, the security level of the communication path established between the management application and the management agent, the security level required of the command executed, and whether the execution has been permitted.

The security level uplift table 1300 registers the uplift in security level that is to be added to the security level required of the command depending on whether the execution has been permitted (shown in the fourth column in the history table). The uplift value is increased when the command has not been executed because the security level of the communication path was lower than the security level required of the command.

Figure 4:
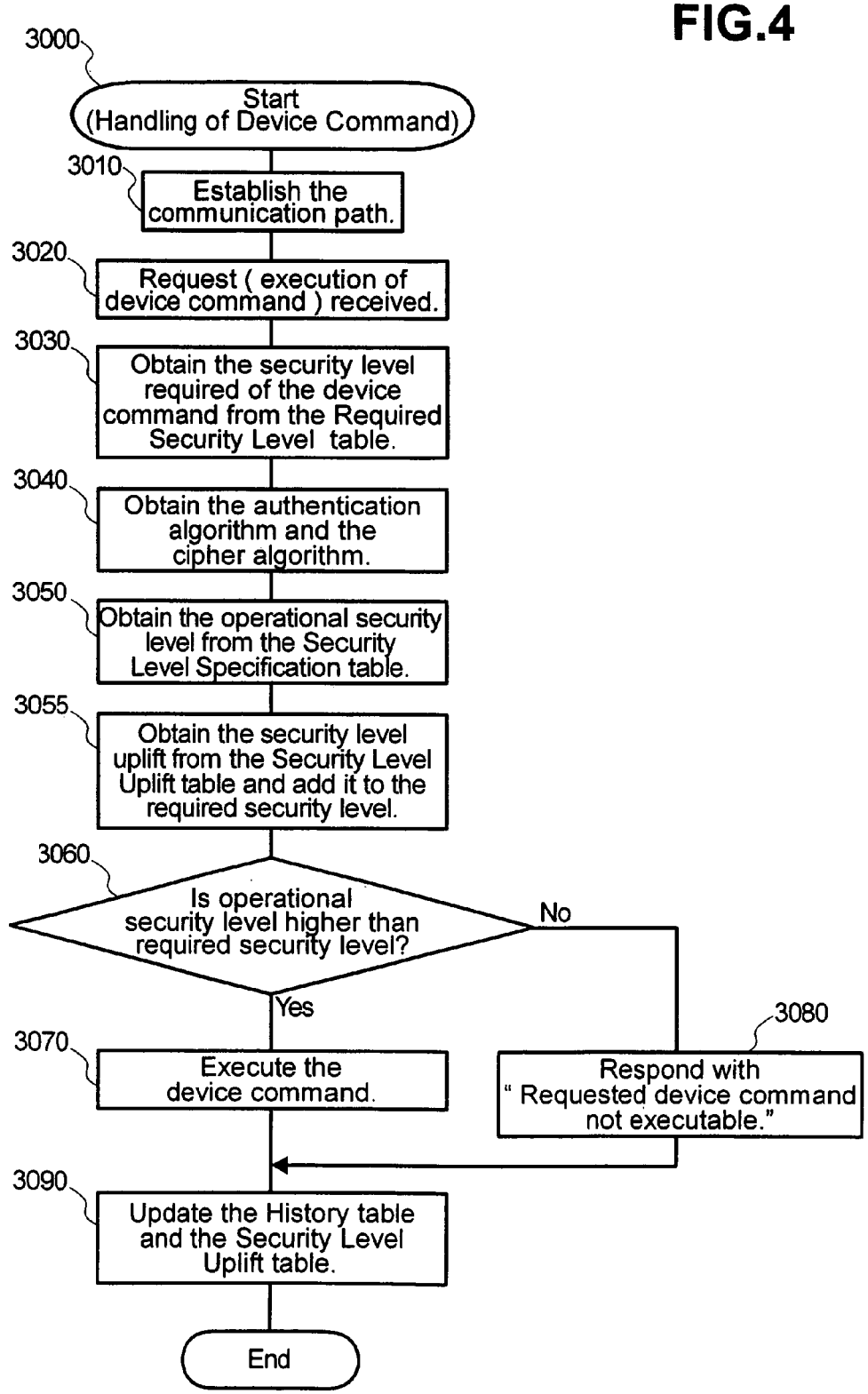
FIG. 4 is a flowchart showing the process of how the management agent handles device commands.

FIG. 4 illustrates how the management agent handles a command issued by the management application. First, the management agent establishes a ciphered communication path using the SSL handshaking protocol described earlier (step 3010). Upon receiving a command from the management application (step 3020), the management agent obtains the security level required for executing it from the required security level table 1100 (step 3030).

It then obtains the cipher algorithm and the authentication algorithm used in receiving the command (step 3040). The cipher algorithm obtained here is actually the one selected and sent to the management application in step 2: Server Hello of SSL handshaking. If SSL is not used, then this is HTTP.

The authentication algorithm obtained here is actually the one with which the management application has been authenticated: It is either SSL (if the management application (SSL client) has been authenticated in step 7: Client Certificate of SSL handshaking) or is taken from the Authentication header of the HTTP request message received in step 3020 (otherwise).

Next, using the cipher algorithm and the authentication algorithm obtained in step 3040, it obtains the security level (operational security level) from the security specification table 1000 (step 3050).

It then obtains the security level uplift value from the security level uplift table 1300 using the client ID of the management application and adds it to the required security level obtained in step 3030 (step 3055).

It then compares the uplifted required security level (security level required by the client) and the operational security level obtained in step 3050 (step 3060), and if the latter is greater than or equal to the former, executes the command (step 3070); otherwise, it notifies the management application that the command cannot be executed (step 3080).

In any case, it then registers into the history table 1200 the client ID, and the security level of the communication path, the required security level, and whether the execution of the command has been permitted. If the execution of the command has been rejected, then it increases the uplift value for this client (management application) in the security level uplift table 1300 (step 3090).

Commands can be targeted at a variety of devices, including the storage subsystem 400, the computer 200, and the fiber channel switch 50. The targeted device stores the security specification table and the required security level table (as shown in FIG. 3) in its memory, and determines whether or not to execute the command depending on the result of the comparison between the security level of the communication path and the security level required of the command.

Whereas the preferred embodiment discussed here may appear to assume that the management application resides in the management computer 300 and that only the management computer 300 issues commands to devices, alternative implementations can be envisaged. For example, each of the devices such as the management computer 300, the computer 200, the fiber channel switch 50, and the storage subsystem 400 has a control unit which issues commands for managing other devices, an interface unit which sends such commands to other devices, and a memory which stores a table indicating the security levels of the communication paths and a table defining the security levels required of commands for other devices. In such a configuration, the control unit of each such device can determine whether or not to issue or send a command, based on the result of the comparison between the security level of the communication path and the security level required of such command.

Alternatively, an arrangement can be made such that the management agent running on the computer 200 is capable of executing control commands on a piece of software such as a database application running on the computer 200 and determines the executability of commands on such piece of software issued by the management application, depending on the security level of the communication path, in the same way as the management agent does for an ordinary device.

According to the present invention, it is possible to maintain the security of a computer system by preventing a malicious and unauthorized intruder from executing potent commands that can cause a significant disruption or down of it, without unreasonably limiting the use of the management application by the system administrator.

What is claimed is:

1. A command processing system for processing commands sent through a communication path between a management application and a management agent, comprising:
   a memory that stores a first table pre-registering operational security levels of the communication path between the management application and the management agent and a second table pre-registering security levels required for execution of commands that the management application requests the management agent to execute;
   first means for obtaining, for each command sent from the management application to the management agent, the operational security level for the command by referencing the first table;
   second means for obtaining, for each command sent from the management application to the management agent, the required security level by referencing the second table;
   third means for comparing the operational security level obtained by the first means and the required security level obtained by the second means; and
   fourth means for determining whether to permit the execution of the command based on result of the comparison made by the third means,
   wherein the first table lists cipher algorithms and authentication algorithms used on the communication path between the management application and the management agent, together with the operational security level assigned to each combination of the cipher and authentication algorithms.

2. The system of claim 1 wherein the second table lists the commands defined between the management application and the management agent, together with the security level required for the execution of each of the commands.

3. The system of claim 1 wherein the fourth means grants permission for command execution when the comparison made by the third means indicates that the operational security level is greater than or equal to the required security level.

4. A command processing system for processing commands sent through a communication path between a management application and a management agent, comprising:
   a memory that stores a first table pre-registering the operational security levels of the communication path between the management application and the management agent and a second table pre-registering security levels required for execution of commands that the management application requests the management agent to execute;
   first means for obtaining, for each command sent from the management application to the management agent, the operational security level for the command by referencing the first table;
   second means for obtaining, for each command sent from the management application to the management agent, the required security level by referencing the second table;

third means for comparing the operational security level obtained by the first means and the required security level obtained by the second means;

fourth means for determining whether to permit the execution of the command based on result of the comparison made by the third means, the memory further storing a third table registering a history of the commands issued from the management application to the management agent and a fourth table holding a security level uplift value for each client ID that is determined according to the result of judgment (execution permitted or rejected) recorded in the third table; and fifth means for adding the security level uplift value obtained from the fourth table to the required security level obtained by the second means;

wherein the required security level thus modified is used in the comparison using the third means.

* * * * *